United States Patent [19]
Poivet

[11] Patent Number: 5,451,983
[45] Date of Patent: Sep. 19, 1995

[54] CUMPUTER ACCESSORY EXHIBITING A COMMON INPUT FOR TWO SEPARATE AUXILLIARY INPUT

[75] Inventor: Michel Poivet, Illkirch, France

[73] Assignee: Laboratoire Europeen de Recherches Electroniques Avancees, Courbevoie, France

[21] Appl. No.: 119,526

[22] Filed: Sep. 13, 1993

Related U.S. Application Data

[63] Continuation of Ser. No. 839,086, Feb. 24, 1992, abandoned.

[30] Foreign Application Priority Data

Nov. 30, 1988 [FR] France ............... 88 15668

[51] Int. Cl.⁶ ........................................ G09G 3/02
[52] U.S. Cl. ............................ 345/157; 345/161; 345/163
[58] Field of Search ............... 345/161, 163, 157, 160, 345/168, 167; 273/148 B, 1 E; 74/471 XY, 471 R

[56] References Cited

U.S. PATENT DOCUMENTS

| | | | |
|---|---|---|---|
| 4,501,424 | 2/1985 | Stone et al. | 273/148 B |
| 4,588,187 | 5/1986 | Dell | 273/1 E |
| 4,594,586 | 6/1986 | Hosogoo | 340/710 |
| 4,685,678 | 8/1987 | Prederiksen | 3440/709 |
| 4,779,079 | 10/1988 | Hauck | 340/711 |
| 4,782,335 | 11/1988 | Gussin | 340/709 |
| 4,816,810 | 3/1989 | Moore | 340/709 |

FOREIGN PATENT DOCUMENTS 0291769 11/1988 European Pat. Off. .

OTHER PUBLICATIONS

IBM Technical Disclosure Bulletin, vol. 24, No. 1A, Jun. 1981, pp. 188–189, New York, US; T. M. Paska: "Device Identification by Test-Signal Duration".

Primary Examiner—Ulysses Weldon
Assistant Examiner—Xiao M. Wu
Attorney, Agent, or Firm—Oblon, Spivak, McClelland, Maier & Neustadt

[57] ABSTRACT

A home computer system having a single input-output which is modified by a identifying circuit to identify a joystick or a mouse the identifying circuit utilizes potentiometers from the joystick which are connected to monostable circuits. The computer automatically recognizes that a joystick is present due to the triggering of the monostable circuits and the reading of the outputs from those monostable circuits.

10 Claims, 1 Drawing Sheet

CUMPUTER ACCESSORY EXHIBITING A COMMON INPUT FOR TWO SEPARATE AUXILLIARY INPUT

This application is a Continuation of application Ser. No. 07/839,086, filed on Feb. 24, 1992, now abandoned.

BACKGROUND OF THE INVENTION

1. Field of the Invention

The invention relates to a computer, particularly a home type, which receives two separate auxiliary input devices.

2. Discussion of Background

A home computer is usually used with a screen, such as a monitor or a television receiver, on which a text and/or drawings or graphs are made to appear. The dialog between the user and computer is generally performed by a pointing device of the "mouse" type or a control stick or joystick.

A mouse is a device that can be moved by the user over a working plane and whose movements, on this plane, are reproduced on the screen by a pointer, for example, in the form of an arrow. Such a device also comprises at least one push button which is actuated when the pointer is at a desired place to execute a command.

To detect the movements of the mouse on the working plane, the latter exhibits in its lower part a spherical wheel associated with two coding wheels, one of which provides an algebraic signal of displacement along the axis of abscissas x,x and the other provides an algebraic signal of displacement along the axis of ordinates y,y.

A control stick or joystick exhibits a lever jointed in all directions on a base. The movements of this lever control the displacement on the screen of a drawn symbol. Such a device can also include two push-type control buttons which, when actuated, make it possible to control operations determined by a program.

On occasion joysticks are employed in pairs. Furthermore, for some joysticks, two potentiometers are associated with each lever. One of the potentiometers represents algebraic pivoting along one degree of freedom and controls the displacement along the axis of the abscissas on the screen, and the other of potentiometer is associated with the algebraic pivoting of the lever along the other degree of freedom and controls the displacement of the object on the screen along the axis of the ordinates. The variable resistor of each of these potentiometers is associated with a monostable circuit and fixes the time constant of this circuit.

Previously, most home computers have two separate inputs for two types of devices: one for the mouse, the other for the joystick. But the multiplication of the number of inputs obliges the user to make choices when making connections, which is convenient. A mouse and joystick are never employed simultaneously.

SUMMARY OF THE INVENTION

Accordingly, it is an object of the present invention to provide both the mouse and the joystick.

The computer system which accomplishes this object includes an input to which either a mouse or a joystick can be connected at will and wherein computer system includes a device for automatically recognizing the type of device connected to the input.

To facilitate automatic recognition of the type of control device connected to the computer, it is preferable that at least one of these devices comprises a circuit intended especially for identification and which thus addresses a specific signal to the computer when it is queried by the latter. If only one of the devices comprises such an identity circuit, the computer will recognize that the other type of device is connected if, in response to a query, it does not receive said specific signal.

Preferably, the identity circuit constitutes a separate element which can be connected between the computer input and the output of the control device. Thus it is possible to use a control device (mouse or joystick) of the usual type, without it being necessary separately to make a control device to which an identity circuit will be connected by design. In this embodiment, only the identity circuit is made separately.

In a preferred embodiment of the invention, the identity circuit is externally connected to the computer and, in turn, is connected to the control device and acts as an element for identification of the control device connected to the corresponding input.

Preferably, the external identity circuit is a monostable circuit connected to the joystick. Then the computer is programmed to command the monostable circuits to verify their existence.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
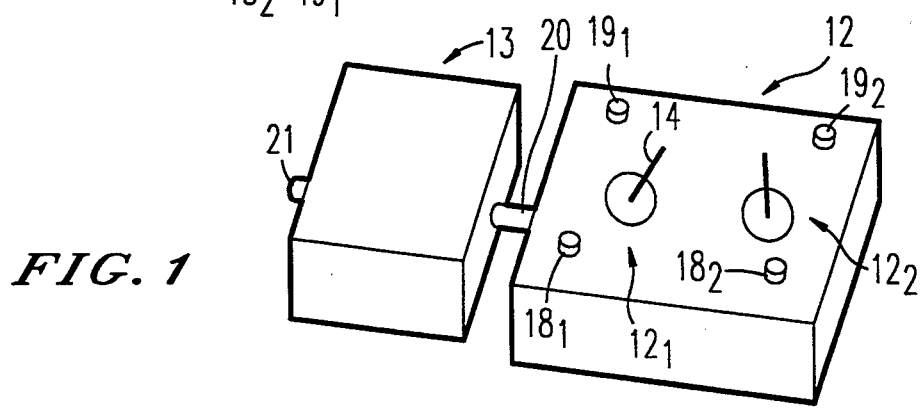
FIG. 1 is a diagram of a joystick and of the identity circuit according to the invention.

Referring now to the drawings, wherein like reference numerals designate identical or corresponding parts throughout the several views, and more particularly to FIG. 1 thereof, a home computer 10 is shown (FIG. 2) having an input 11 intended for the connection of a device of the "mouse" type (not shown) for control and pointing on the screen. The mouse and corresponding circuits in computer 10 are standard and are therefore not described in detail.

The invention consists in using the same input 11 for optional connection of either a mouse or a joystick 12 by the identity circuit 13 (FIG. 1).

Joystick 12 is a normally available product which, in the example, is of the double type, i.e., it comprises two identical elements 121, 122 in the same case. Each element comprises a stick 14 consisting of a lever pivoting along two degrees of freedom around an axis 15. Each lever or stick 14 is associated with two potentiometers $16_1$, $17_1$ (FIG. 2) inside the case. The value of the resistance of potentiometer $16_1$ represents a coordinate, for example the abscissa, of an object on the screen, while the value of the resistance of potentiometer $17_1$ represents the other coordinate (ordinate) of the same object on the screen.

Further, each element exhibits two control push buttons $18_1$, $19_1$ which, when pushed down, perform a command determined by the program. Depending on the type of device and the program loaded in computer 10, either the two push buttons 18, 19 perform the same or different functions.

The device 12 includes an output connector 20 which is connected to the input of identity circuit 13 which is, in turn, connected, by another connector 21, to input 11 of computer 10. Circuit 13 thus constitutes not only an identity circuit but also an adapter. Further, as will be seen below, circuit 13 contains not only elements necessary for the functioning of the joystick but also which are found, in standard technology, in the circuits of the computer itself.

Connector 20 includes output wires for all the elements of device 12, i.e., for each of potentiometers 16, 17 and each of switches 18, 19 as well as a power supply wire and a ground wire.

The circuit 13 includes four monostable devices in circuit 22 in the form of a single integrated circuit with inputs for the signals of potentiometers $16_1$, $17_1$, $16_2$, $17_2$ and other inputs for signals coming from capacitors $23_1$, $24_1$, and $23_2$, $24_2$.

Figure 2:
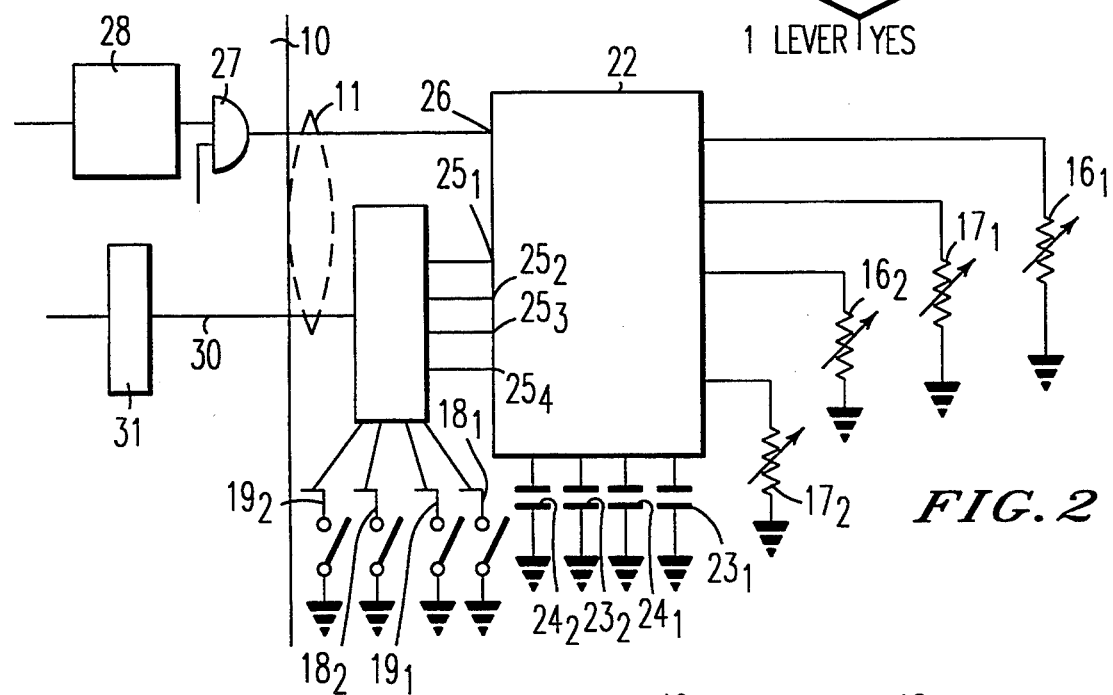
FIG. 2 is a diagram of a computer connection to a joystick.

Potentiometer $16_1$ is, with capacitor $23_1$, connected to one of the monostable devices of circuit 22. The time constant of this monostable depends on the capacitance of capacitor $23_1$ and the value of the resistance of potentiometer $16_1$. It is recalled that a monostable is a device whose output is normally at a determined level, for example, zero, and which, when it receives an input pulse, exhibits at its output a signal of a different level, level 1, which it maintains for a preset period, after which the output signal returns to zero value. In this case, the preset time is a function of the value of the resistance of potentiometer $16_1$. The output signal of the first monostable appears at an output $25_1$ of circuit 22. Also, the second, third and fourth monostable devices of circuit 22 have time constants which depend on the values of the resistances of potentiometers $17_1$, $16_2$ and $17_2$, respectively, and the output signals of these monostables appear at reference outputs $25_2$, $25_3$ and $25_4$ respectively (FIG. 2).

Moreover, circuit 22 exhibits a validation input 26 connected, by connector 21, to one of input-output wires 11 which is connected to an output of a validation gate 27 inside computer 10. An input of this gate 27 is connected to an output of an address decoding circuit 28, which, in the example, is in an integrated circuit (not shown) combining a certain number of interface circuits of the computer. The other input of gate 27, which, preferably, also is incorporated in the integrated circuit (not shown), receives a validation signal.

Except for input 26 of the power supply and ground, all other conductors of connector 21 of circuit 13 are connected to data bus 32, which is connected to a circuit 31 in computer 10 intended for reading the outputs of circuit 22 and the states of switches $18_1$, $19_1$, $18_2$, $19_2$. Preferably, circuit 31 also belongs to the same integrated circuit to which circuits 27 and 28 belong.

In the prior art, a computer comprising an input for a joystick device exhibits monostable circuits in the computer itself. Thus, the advantage of the invention is to reduce the cost of computer 10 itself since the latter does not comprise monostable circuits.

Further, circuit 22 is advantageously used to determine automatically if a joystick or mouse type device is connected to input-output 11.

Figure 3:
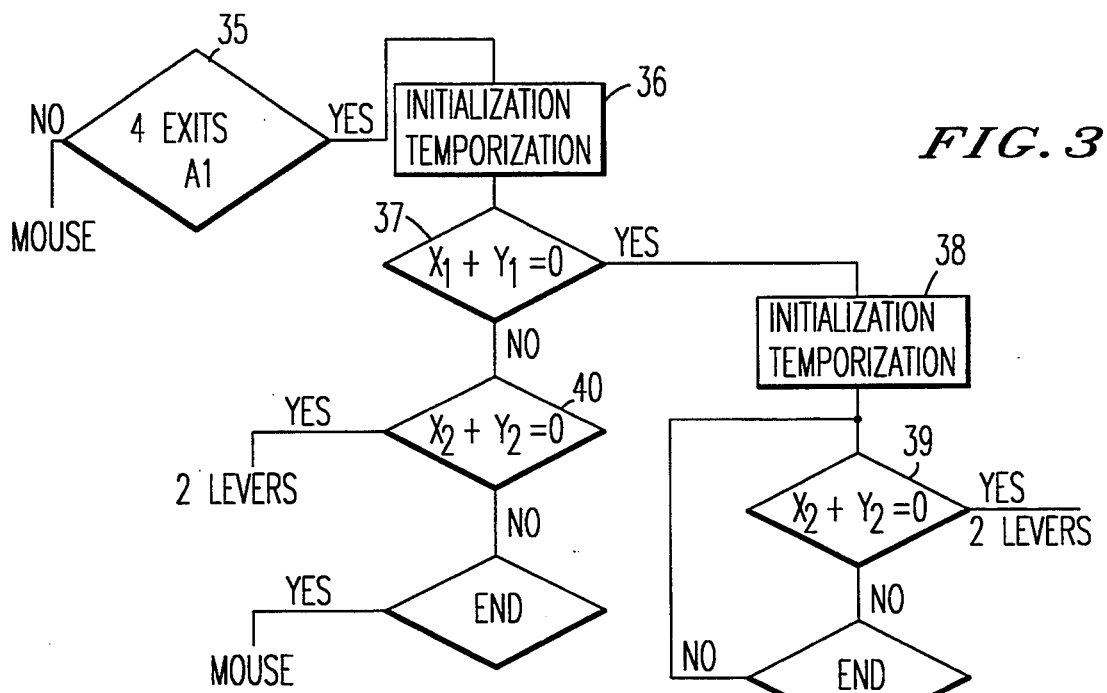
FIG. 3 is a flow chart relating the functioning of the circuits of FIG. 2.

For this purpose, the computer exhibits software for querying inputs-outputs 11 which is represented in part in FIG. 3.

At the start-up of the computer, an activation (by pulse on input 26) of the monostables is provided, followed by a first hold period to ensure that, if all the monostable circuits are connected to input-output 11, subsequently they all have the same zero state (or 1 if a joystick is not connected) at their output. If at the end of the first hold period all outputs are at 1, the program recognizes the absence of a joystick and configures the computer to function with a mouse. Then, the monostables are all triggered by a pulse at input 26 and, during a second hold period, the queries represented in FIG. 3 are made by use of circuit 31. The following determination sequentially occurs:

It is first determined, immediately after triggering, if four outputs $25_1$, $25_2$, $25_3$ and $25_4$ are at state 1 (FIG. 3, diamond 35). If such is not the case, it is certain then that monostables are not involved. In this case, the computer configures itself to function with the mouse type device.

If the result of this query is that four outputs 25 are actually at 1, then again, by a pulse at input 26, the monostables are actuated and a new hold is initialized (rectangle 36) and then it is determined whether or not outputs $25_1$ and $25_2$ (signals $x_1$ and $y_1$) return to zero during the third hold period (diamond 37).

In case of positive response, i.e., in case of the return of outputs $25_1$ and $25_2$ to zero during the third hold period, it is then certain that at least one joystick is connected to input-output 11. However, it is necessary to determine if the second joystick is connected. For this reason, a fourth hold period 38 is initialized and during this period third and fourth outputs $25_3$ and $25_4$ (signals $x_2$ and $y_2$) are scanned (39). If, during this period, third and fourth outputs $25_3$ and $25_4$ return to zero, the computer is put in a configuration for receiving two joysticks. On the other hand, if at the end of fourth hold period 38, the signals at outputs $25_3$ and $25_4$ have not returned to zero, the computer is placed in a configuration for connection of only one joystick.

It is also possible that during third hold period 36, third and fourth outputs $25_3$ and $25_4$ both pass to the zero state, while the first two, or one of the first two, $25_1$ and $25_2$, is still at state i. In this case (diamond 40), the computer is placed in the configuration for connection of two joysticks, even if, in fact, only one joystick is connected.

If, at the end of third hold period 36, four outputs $25_1$, $25_2$, $25_3$, $25_4$ have not all returned to zero, then the computer is configured for receiving a mouse type device.

It should be noted that, in the example, input-output 11 has only 9 pins, which is insufficient for a double joystick with two switches 18, 19 for each stick. Actually, for each stick-switch unit 18, 19 four pins are necessary: two for the potentiometers and two for the switches, or eight pins in all, to which must be added two additional pins, one for the power supply and the other for the ground. If input 26 is also taken into account, eleven pins would be needed. Of course, it would be possible to provide eleven pins for input-output 11. But for reasons of economy and to simplify the embodiment, only the usual nine pins for connection of a mouse type device are provided. To take this characteristic into account, when two joysticks are connected (or when the computer is in this configuration), only one switch (18 or 19) per stick 14 is used, the other being inactive. On the other hand, when only the first joystick is connected, both its push buttons 18, 19 can be used. If only circuit 13 is connected to input-output 11, without joystick 12 being connected to it, at the end of the first hold period, the monostables will remain at state 1 because their own hold period is then very great, since they have, at their inputs corresponding to those of the potentiometers, a practically infinite resistance. Then, the computer is configured as if it were connected to a mouse.

The arrangement, which consists in providing an accessory circuit 13 with monostables on the outside of the computer, i.e., optionally and not obligatorily inside the computer, can be used independently because the input-output is provided for two different functions. In this case, the advantage is that the computer itself is improved because it does not include monostables.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A computer system, comprising:
    a computer having an interface for connecting to one of a first pointing device and a second pointing device, said interface including a control means for automatically identifying whether said first pointing device or said second pointing device is connected to said interface;
    an identity circuit, connected to said interface only when said first pointing device is connect to said interface, said identity circuit including at least one capacitor and including a trigger input;
    wherein said first pointing device has a pointing function and includes at least one potentiometer, a parameter of the pointing function being a resistance of said at least one potentiometer, a value of said resistance and a value of said at least one capacitor controlling a hold period of a corresponding monostable circuit, an output of said monostable circuit being connected to said interface, said identity circuit including a triggering input to trigger said monostable circuit; and
    wherein said control means tests for the connection of said first pointing device to said interface by emitting a triggering signal to said triggering input and identifying that said first pointing device is connected to said interface by detecting a triggering output from said monostable circuit and identifying that said second pointing device is connected to said interface when said triggering output from said monostable circuit is undetected.

2. A computer system according to claim 1, wherein said first pointing device is a joystick type device comprising a stick connected to said at least one potentiometer, said at least one potentiometer including two potentiometers, wherein resistances of said two potentiometers represent a coordinate of a location on a screen.

3. A system according to claim 2, wherein said joystick type device is one of a single or double joystick and wherein said identity circuit emits different signals depending on whether said joystick type device is a single or double joystick.

4. A system according to claim 3, wherein said control means identifies either a single or double joystick type device as a function of whether or not the output signal of the monostable circuit returns to an initial state in a given time.

5. A system according to claim 4, each joystick type device comprises two control switches and wherein a number of input/output pins of said interface is insufficient for all of the signals of said two control switches and wherein said control means configures the computer to take into account only one switch when two joystick devices are identified.

6. A system according to claim 1, wherein said control means comprises an address decoder, a validation gate and a reading circuit for reading the output of said monostable device.

7. A system according to claim 1, wherein said identity circuitry is housed in and placed between said interface and said first pointing device, when said first pointing device is connected to the interface.

8. A computer system according to claim 1, wherein said monostable circuit is part of said identity circuit and said control means tests for the connection of said first pointing device to said interface by testing for connection of said monostable circuit to said interface.

9. A method for detecting if a device which is external to a computer and includes a monostable circuit and a pointing device containing a potentiometer is connected to the computer, comprising the steps of:
    emitting a trigger signal by the computer;
    receiving the triggering signal and triggering the monostable circuit which has a hold period which depends on a resistance of said potentiometer and transmitting a trigger output from said monostable circuit to said computer, only when said device including the monostable circuit and the pointing device containing the potentiometer is connected to the computer;
    determining by the computer that said device containing the monostable circuit and the pointing device is connected to the computer, only when the trigger output is received by the computer; and
    determining by the computer that said device containing the monostable circuit and the pointing device is unconnected to the computer, when the trigger output is not received by the computer.

10. A method for detecting according to claim 9, wherein said pointing device is a joystick containing the potentiometer and said transmitting of the trigger output is performed only when the device including the monostable circuit and the pointing device which is the joystick containing the potentiometer is connected to the computer.

* * * * *

UNITED STATES PATENT AND TRADEMARK OFFICE
CERTIFICATE OF CORRECTION

PATENT NO. : 5,451,983
DATED : September 19, 1995
INVENTOR(S) : Michel POIVET

It is certified that error appears in the above-indentified patent and that said Letters Patent is hereby corrected as shown below:

On the title page, Item [54] and Column 1, Lines 2-4, the title should read:

--COMPUTER ACCESSORY EXHIBITING A COMMON INPUT FOR TWO SEPARATE AUXILLIARY INPUT--

Signed and Sealed this

Twenty-eighth Day of November 1995

Attest:

BRUCE LEHMAN

Attesting Officer

Commissioner of Patents and Trademarks